Oct. 4, 1966 J. H. HAMMOND, JR 3,277,429

COMMUNICATION SYSTEM

Filed April 8, 1959 4 Sheets-Sheet 1

INVENTOR
JOHN HAYS HAMMOND JR.

BY

ATTORNEY

INVENTOR
JOHN HAYS HAMMOND JR.

BY

ATTORNEY

Oct. 4, 1966 J. H. HAMMOND, JR 3,277,429

COMMUNICATION SYSTEM

Filed April 8, 1959 4 Sheets-Sheet 3

INVENTOR
JOHN HAYS HAMMOND JR.

BY [signature]

ATTORNEY

Oct. 4, 1966 J. H. HAMMOND, JR 3,277,429

COMMUNICATION SYSTEM

Filed April 8, 1959 4 Sheets-Sheet 4

INVENTOR
JOHN HAYS HAMMOND JR.

BY

ATTORNEY

United States Patent Office
3,277,429
Patented Oct. 4, 1966

3,277,429
COMMUNICATION SYSTEM

John Hays Hammond, Jr., Gloucester, Mass.; Ralph G. Lucas, Nathaniel L. Leek, and the National Shawmut Bank, executors of said John Hays Hammond, Jr., deceased Filed Apr. 8, 1959, Ser. No. 804,997
6 Claims. (Cl. 340—2)

This invention relates to communication systems for submarines and more particularly to a two-way communication system for submerged submarines involving radio and sonic links.

The object of the invention is to provide a communication channel from a naval base to a moving submerged submarine when thousands of miles distant from the base, and also to provide a separate communication channel from the submarine to the base. The communication channel from the base to the submarine includes a radio link utilizing very low frequency radio waves transmitted from the base to a receiving loop located within a floating plastic buoy. The message received at the buoy is transformed within the buoy into high frequency sonic waves in the sea water. The sonic signal is transmitted from the buoy and received in the moving submerged submarine.

The second communication channel from the submerged submarine to the base includes a sonic link from the submarine to the buoy through the sea water. Within the buoy the sonic signal is transformed into a short-wave radio signal. The short-wave signal is transmitted above the sea from the buoy to the base station.

The submarine carries in suitable housings or casings a number of buoys. One of the buoys is released by the submarine when communication to and from the base is desired or scheduled. The buoy rises to the surface and floats with a small fraction of its spherical shell above water.

A special sonic command from the submarine raises a short wave antenna on the buoy, and also lowers one or more sonic transducers to the depth in the water corresponding to the minimum-velocity sound channel. In this channel sonic signals are propagated over long distances. Hence the submarine may be in sonic contact with the buoy when cruising about the buoy within a radius of many miles.

The floating buoy is made of plastic or other suitable material which permits the low frequency radio waves to penetrate the shell to two crossed receiving loops. The two loops are connected to a receiver so as to assure reception of the radio message however the buoy may be oriented. The received message, comprising dot and dash code characters, then actuate a sonic transmitter so as to relay the message to the submarine by high frequency waves in the water.

Messages from the submarine to the base are transmitted as high frequency sound waves in the water from the submarine to the buoy. Within the buoy the message characters received through the sonic transducer may actuate directly a short-wave transmitter or may be recorded on magnetic tape, which is subsequently speeded up to provide high speed burst transmissions from the short-wave antenna. The short-wave radio message is transmitted over long distances to the base by propagation through the air channel between the surface of the ocean and the ionospheric layer.

A second special sonic signal from the submarine may open sea cocks in the buoy to cause it to sink when that particular buoy is no longer needed for communication.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which FIG. 1 shows diagrammatically the submarine and floating buoy;

Like reference characters denote like parts in the several figures of the drawing.

In the following description parts will be identified by specific names for convenience, but they are intended to be generic in their application to similar parts.

Figure 1:
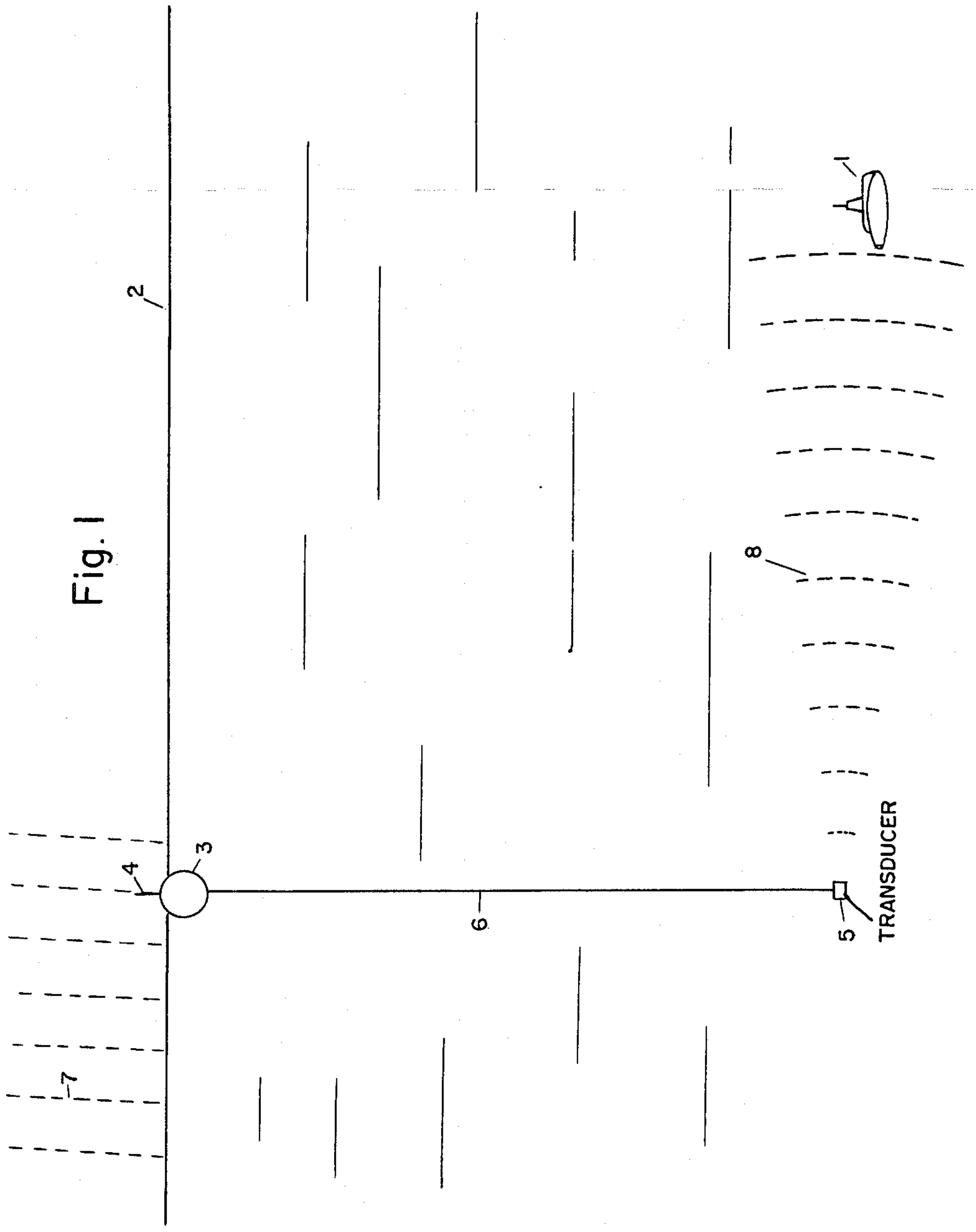

Referring to FIG. 1, the submarine 1 is shown submerged below the surface 2 of the ocean. The buoy 3 is shown provided with a short-wave antenna 4 and a sonic transducer 5 lowered on cable 6 to a depth to provide best sonic-wave transmission and reception. The radio waves 7 from the base station to the buoy, and the sonic waves 8 from the transducer 5 to the submarine 1 are diagrammatically indicated.

If desired there may be additional sonic transducers spaced at suitable intervals along cable 6 to ensure that one at least will fall within the long-distance sound channel in the water.

Figure 2:
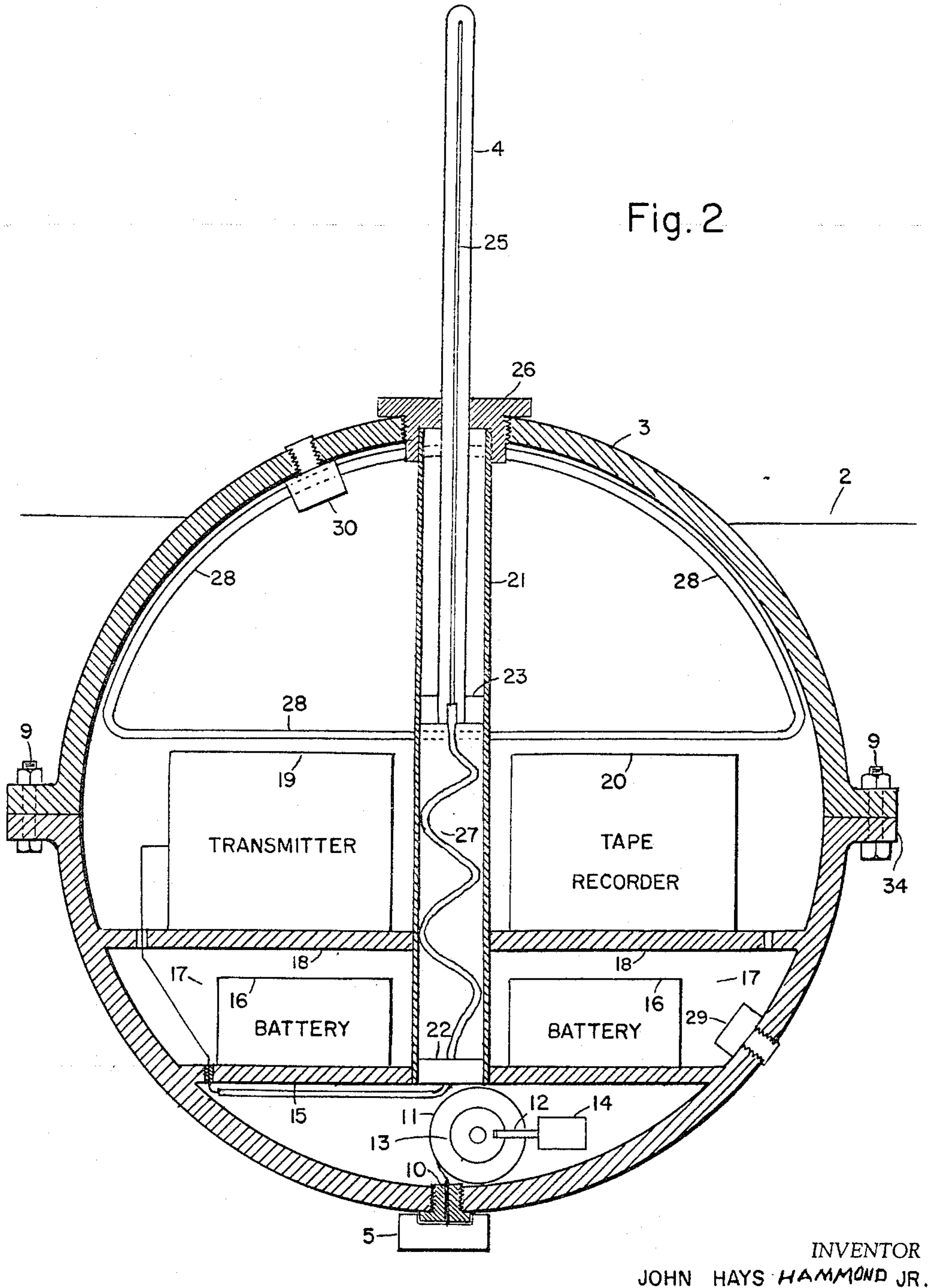
FIG. 2 is a vertical section of the buoy.

FIG. 2 shows diagrammatically in vertical section one possible design of the floating buoy. A spherical shell 3, made of plastic or other suitable material transparent to the radio waves, is made in two halves bolted together by bolts 9. The shell 3 must be of sufficient strength to withstand the high pressures encountered at the maximum depth to which the submarine submerges.

At the lowest point of shell 3 is a gland 10 through which cable 6, attached to the sonic transducer 5, can easily pass. In FIG. 2 the cable 6 is wholly contained on reel 11 retained in the position to hold transducer 5 tight against shell 3 by reason of a key 12 which fits into a slot in the circumference of a disk 13 attached to the reel 11. The key 12 can be withdrawn from the slot in disk 13 by a current pulse in solenoid 14, as will be explained later, thus allowing the transducer 5 to sink to the predetermined depth as diagrammatically indicated in FIG. 1. Reel 11 and solenoid 14 are mounted in a lower compartment bounded by shell 3 and a water tight partition 15. Since the gland 10 may leak water if the cable 6 is to be able to move freely, the lower compartment may fill with water.

Batteries 16, attached to partition 15 and housed in compartment 17 formed by the shell 3 and partitions 15 and 18, supply electrical power to the equipment.

Some of the electrical equipment such as the transmitter 19 and the tape recorder 20 are shown in FIG. 2 mounted on partition 18. Other pieces of equipment are also mounted on partition 18 in front of and behind the section shown in FIG. 2 as will be described later.

Partitions 15 and 18 are constructed so as to be removable to permit installation of the batteries 16 and reel mechanism 11–14.

A metal tube 21, closed at its lower end by plug 22, is attached to the upper half of shell 3 and passed tightly through partitions 18 and 15. A piston 23, attached to the lower end of antenna 4, can be caused to move upwardly within the tube 21 by compressed air admitted to the inside of tube 21 through an electrically operated valve, not shown in FIG. 2 but later to be described.

The antenna assembly 4 consists of a metal rod 25 encased in a plastic cover which slides upward through gland 26 when moved by the air pressure pushing upon piston 23. The metal rod 25 is electrically connected to transmitter 19 through the flexible insulated cable 27 coiled within the lower part of tube 21.

A receiving loop 28 is located in the upper half of the shell 3, and is connected to the receiver as will be explained later. Another loop 28, not indicated in FIG. 2, is mounted at right angles to loop 28.

Electrically operated valves 29 and 30, when opened as will be later explained, allow sea water to fill the buoy 3 causing it to sink and hence to be expended.

Figure 3:
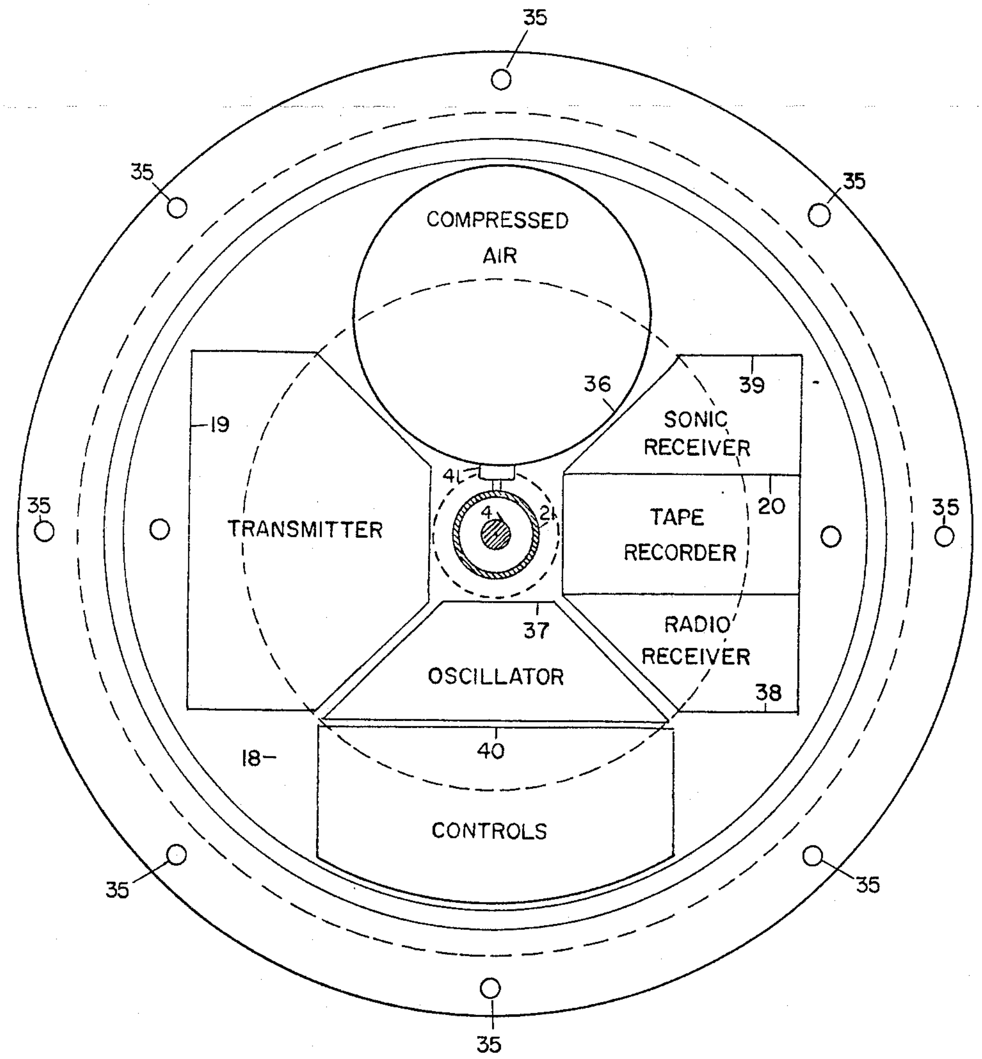
FIG. 3 is a horizontal section of the buoy.

FIGURE 3 is a view of the lower half of the buoy when the upper portion is removed. The arrangement of the equipment shown corresponds to the arrangement described in connection with FIG. 2.

The holes 35 in flange 34 to accommodate bolts 9 for holding together the two halves of the shell 3 are indicated. Tube 21 and antenna 4 are shown in section.

Mounted on partition 18 are transmitter 19, tape recorder 20, compressed-air tank 36, sonic oscillator 37, radio receiver 38, sonic receiver 39, and a compartment 40 containing control relays, all to be described later.

An electrically controlled air valve 41, which permits compressed air to pass from tank 36 into tube 21 when opened by the proper signal, will be described later.

Figure 4:
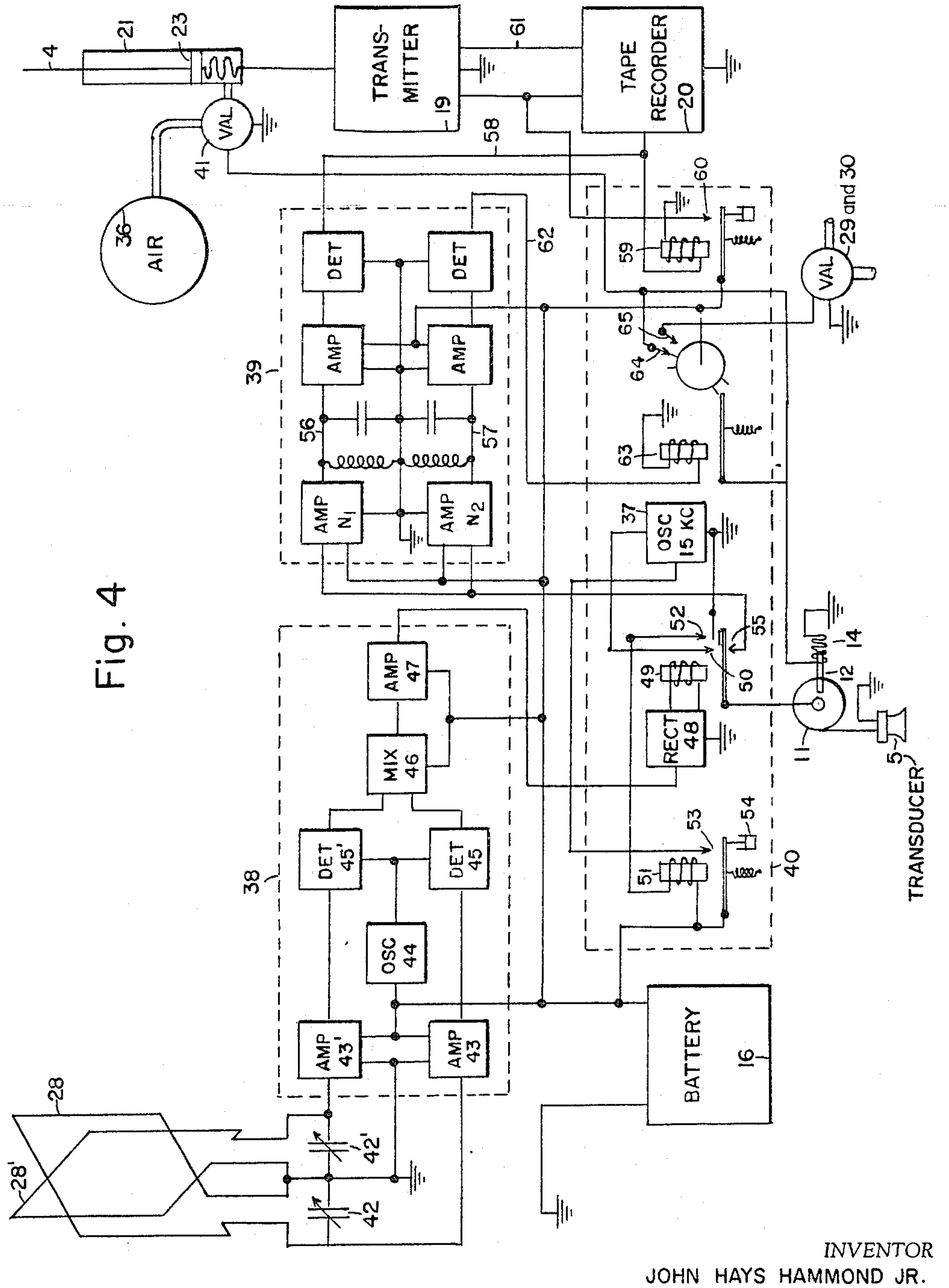
FIG. 4 is a schematic diagram of the circuits in the buoy.

The operation of the system may be understood by reference to the schematic wiring diagram shown in FIG. 4.

The two crossed-loop antennas 28 and 28' are tuned by capacitors 42 and 42' to the radio signal wave which may have a frequency of the order of 15,000 cycles per second. The signal voltages set up across each of the tuned circuits are separately increased by amplifiers 43 and 43'. These signal waves are heterodyned by oscillator 44 and separately detected by detectors 45 and 45'. The two beat signals are then combined additively in mixer 46. By this arrangement a signal will be received independently of the orientation of the loops 28 and 28' with respect to the direction of arrival of the radio signal wave.

The final output signal of mixer 46 is increased in power by amplifier 47, converted to unidirectional pulses by rectifier 48, and then actuates relay 49. The radio receiver comprising blocks 43, 43', 44, 45, 45', 46 and 47 are contained in block 38. All of the vacuum tubes or transistors in this receiver are constantly activated by battery 16 after launching of the buoy.

The dot-and-dash signals, acting through relay 49, close contact 50 permitting high frequency currents to pass from oscillator 37 to transducer 5 thus producing sonic signal waves 8 corresponding to the dots and dashes.

Since oscillator 37 requires considerable power, it is activated only when a message is being converted from the rectified radio signals into acoustic signals. This activation of oscillator 37 is effected by relay 51 which, when closed, remains closed for a certain predetermined time. The first radio signal which closes contact 50 of relay 49, also closes contact 52. Thus a current is sent through the coil of relay 51, closing contact 53, which completes the circuit from battery 16 to oscillator 37. Relay 51 remains closed, by reason of dash pot 54, and the successive radio signals for a sufficient period for the completion of the message from the base station to the submarine.

The transmission of a message from the submarine to the base station follows the channel comprising the route from submarine 1 to transducer 5 and sonic receiver 39, to tape recorder 20, to transmitter 19, and then to base station by radio waves emitted by antenna 4.

Relay 49, when not activated by an incoming radio signal, maintains contact 55 in a closed condition completing the circuit from transducer 5 to sonic receiver 39.

Sonic receiver 39, containing transistors or vacuum tubes, is continuously activated by battery 16 after the buoy is launched from the submarine. The sonic receiver 39 possesses two channels tuned to different sound frequencies $N_1$ and $N_2$ by circuits 56 and 57. A signal of frequency $N_1$ to which circuit 56 is responsive, is amplified and rectified in the $N_1$ channel, and gives dot-and-dash pulses in line 58 to tape recorder 20. The channel for frequency $N_2$ is for a different purpose and will be described later.

The tape recorder 20 and the transmitter 19 are normally inactive but, as in the case of the oscillator 37, are activated from battery 16 by the first sent message character. The first signal over line 58 closes time-delay relay 59, thus closing contact 60 for a predetermined time interval. The closing of contact 60 completes the power circuit from battery 16 to tape recorder 20 and transmitter 19.

As soon as the tape recorder 20 is activated, messages over line 58 may be recorded on magnetic tape. The message over line 58 may pass directly to line 61 and thence to transmitter 19.

The operation of the two way communication system has been described above assuming the buoy is launched by the submarine and is in an activated condition. The procedure for preparing the system for operation just after launching and for sinking the buoy when it is no longer needed will now be described. As stated above, when the buoy is launched from the submarine a switch, not shown in the drawings, is closed feeding power to radio receiver 38 and sonic receiver 39. These two receivers, which take very little power, are thereafter active.

A sonic signal from the submarine of frequency $N_2$ passes through the second channel of sonic receiver 39 containing tuned circuit 57. An output pulse from this channel passes over line 62 to latch relay 63. The first contact 64 is thus closed causing current to flow from battery 16 to coil 14. The key 12 is pulled by coil 14 from the slot in disk 13, releasing reel 11 and permitting transducer 5 to sink to a predetermined depth.

On closing of contact 64 a current also passes to valve 41 allowing compressed air from tank 36 to pass into cylinder 21. This compressed air pushes up piston 23 causing antenna 4 to be erected ready for radio transmission.

When the sonic buoy is no longer needed, a second sonic message of frequency $N_2$ is sent from the submarine which closes the second contact 65 of latch relay 63. Closing this contact completes a circuit from battery 16 through valves 29 and 30. When valves 29 and 30 are opened, sea water enters shell 3 causing the buoy to sink.

Although only a few of the various forms in which this invention may be embodied have been shown herein, it is to be understood that the invention is not limited to any specific construction but may be embodied in various forms without departing from the spirit of the invention.

What is claimed is:

1. A system for communicating with submerged submarines, comprising a buoy to be released from the submarine, said buoy carrying radio transmitting and receiving means, sonic transmitting and receiving means and remote controlled means for rendering said radio and sonic transmitting means operative, and translating means in said buoy responsive to said radio receiving means to actuate said sonic transmitting means and responsive to said sonic receiving means to actuate said radio transmitting means for relaying radio messages via sonic waves to said submarine and for relaying sonic messages from said submarine to said radio transmitter.

2. A system as set forth in claim 1 in which said radio receiving means includes a non-directional antenna.

3. A system as set forth in claim 1 in which said sonic means includes a compressional wave transmitter suspended below said buoy, and means is provided to extend said transmitter.

4. A system as set forth in claim 3 in which remote control means is provided to extend said compressional wave transmitter.

5. A system as set forth in claim 1 in which said buoy includes sea valves to admit sea water for sinking the buoy, and means responsive to received sonic energy is provided to open said sea valves.

6. A system as set forth in claim 1 in which said radio transmitting means includes an extensible antenna, said remote control means is responsive to a sonic signal received by said sonic receiving means, and is connected to extend said antenna.

References Cited by the Examiner

UNITED STATES PATENTS

| | | | |
|---|---|---|---|
| 1,529,065 | 3/1925 | Hammond | 340—2 |
| 1,546,579 | 7/1925 | Hammond | 114—21 |
| 1,664,549 | 4/1928 | Hammond | 114—21 |
| 2,431,018 | 11/1947 | Bailey et al. | 340—2 |
| 2,448,787 | 9/1948 | Ferrel | 340—2 |
| 2,593,432 | 4/1952 | Freas | 340—2 |
| 2,629,083 | 2/1953 | Mason et al. | 340—2 |
| 2,978,668 | 4/1961 | Kurie et al. | 340—2 |

FOREIGN PATENTS

| | | |
|---|---|---|
| 1,020,463 | 12/1957 | Germany. |

OTHER REFERENCES

The Journal of The Acoustical Society of America, June 1957, "Ultrasonic Propagation Measurement in Sea Water Up to 400 kc.," by Hashimotto et al., vol. 29, No. 6 (pp. 702–703 relied on).

CHESTER L. JUSTUS, *Primary Examiner.*

D. G. BREKKE, R. A. FARLEY, *Assistant Examiner.*